United States Patent [19]

Mulawski

[11] 4,416,388
[45] Nov. 22, 1983

[54] PRESSURE RELIEF DEVICE

[75] Inventor: Walter J. Mulawski, Chelmsford, Mass.

[73] Assignee: Sexton Can Company, Inc., Everett, Mass.

[21] Appl. No.: 419,665

[22] Filed: Sep. 20, 1982

[51] Int. Cl.³ .......................... F17B 1/14; B21D 51/26
[52] U.S. Cl. .................................. 220/207; 137/68 R; 220/89 A; 222/397
[58] Field of Search ...................... 220/89 A, 207, 267; 137/68 R; 222/397, 396

[56] References Cited

U.S. PATENT DOCUMENTS 2,168,609  8/1939  O'Brien et al. ................. 220/207 X
2,336,490  12/1943  Lovico ............................. 220/89 A
3,938,693  2/1976  Patel et al. ....................... 220/267

Primary Examiner—Allan N. Shoap
Assistant Examiner—Robert Petrik
Attorney, Agent, or Firm—Thompson, Birch, Gauthier & Samuels

[57] ABSTRACT

A pressure relief device is disclosed for a container having a cylindrical side wall which is closed at one end by an internally concave bottom wall. The device comprises an externally protruding first cup formed as an impression in the container bottom wall. The first cup has a first circular wall which is joined at one end to the container bottom wall and which is closed at the opposite end by a first base portion; A tab member is located in the first base portion. The tab member is partially circumscribed by a line of reduced material thickness along which the first base portion is adapted to separate in response to an overpressurization of the container contents, thus freeing the tab member for outward deflection to provide an outlet through which the contents may escape. A second element having a second circular wall is forcibly received within the first circular wall of the first cup. The second circular wall is dimensioned to coact with the first circular wall to radially stress the first base portion in tension.

11 Claims, 5 Drawing Figures

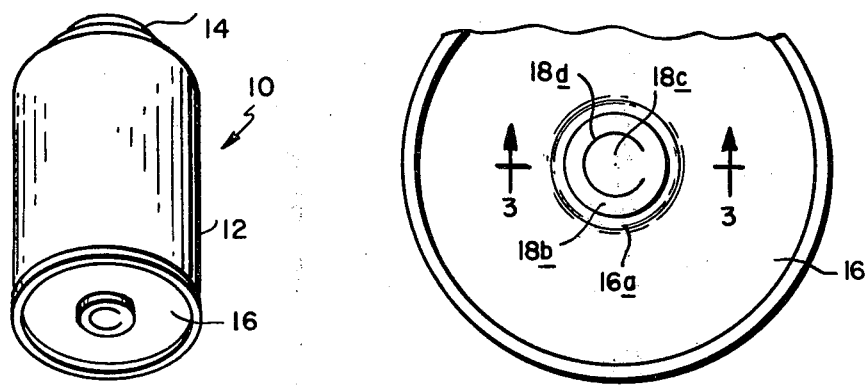
FIG. 1
FIG. 2
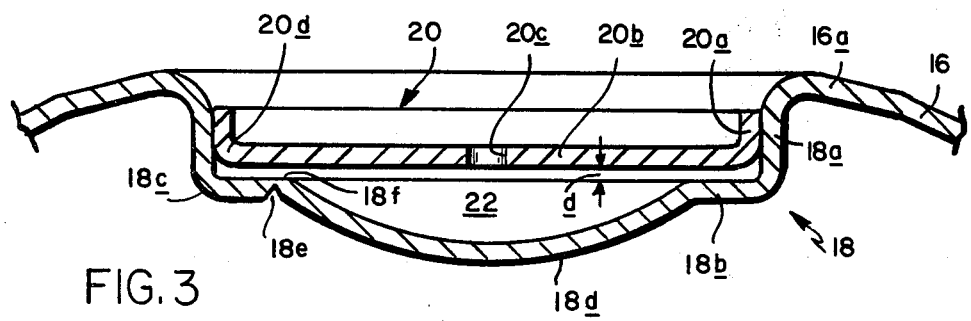
FIG. 3
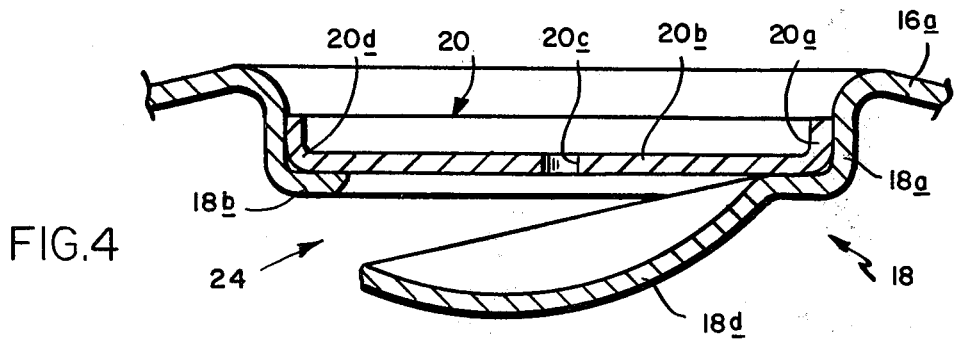
FIG. 4
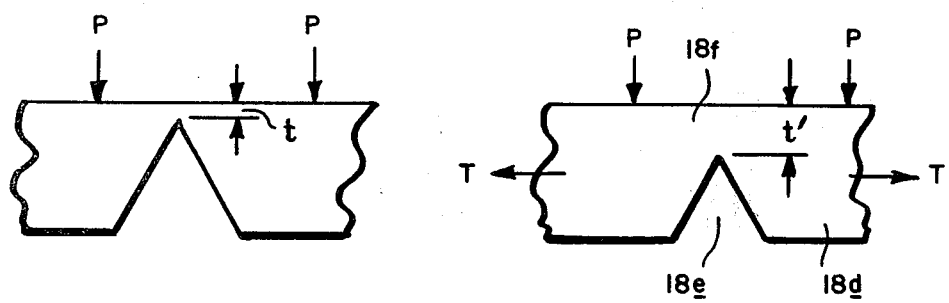
FIG. 5
PRIOR ART
FIG. 5A

PRESSURE RELIEF DEVICE

BACKGROUND OF THE INVENTION

This invention relates to pressure release devices for internally pressurized fluid containers.

Pressurized fluid containers are in widespread use for packaging and dispensing a variety of fluid products, including liquids, gases and combinations thereof. Under normal operating conditions, such containers perform entirely satisfactorily. However, in the event that the contents of such containers should become over pressurized, either because of improper use, exposure to heat or for any other reason, then a violent rupture may occur. For the last 25 years, those skilled in the art have been attempting to solve this problem by incorporating various types of pressure release devices into the container structures. Examples of some of these previously developed pressure release devices are disclosed in U.S. Pat. Nos. 2,795,350 (Lapin); 3,074,602 (Shillady et al); 3,292,826 (Ablanalp); 3,622,051 (Benson); 3,724,727 (Zundel); 3,815,534 (Kneusel); 3,826,412 (Kneusel); 3,831,822 (Zundel); and 4,003,505 (Hardt).

In each of these prior art arrangements, either the container bottoms or the container side walls are scored or "coined" to provide weakened areas. These weakened areas are designed to separate and release the container contents under controlled conditions and at selected pressures beneath those at which more violent and potentially dangerous ruptures are likely to occur.

A major difficulty with these prior art arrangements, however, lies in the fact that in order to weaken a side or bottom wall sufficiently to achieve a selected release pressure, the coining often must be relatively deep. For example, assume that a pressure container has a circular internally concave bottom 2.545" in diameter fabricated from 0.015" deep drawn tempered steel, and that the bottom is coined to provide an integral generally circular pressure release tab with a diameter of approximately 0.427". In order for the tab to release at a selected pressure which is above 270 psi (minimum release pressure established by the U.S. Department of Transportation) and below a pressure at which a container wall may experience an uncontrolled violent rupture, the coining operation must be carried out to a depth of approximately 0.014", leaving an intact web underlying the coined indentation of only about 0.001". Because of the embrittlement produced by work hardening during the coining operation, such relatively thin webs are highly susceptible to damage and premature rupture during subsequent normal handling and use of the containers. Moreover, these relatively thin webs often develop microscopic cracks or fissures which allow the container contents to leak.

SUMMARY OF THE PRESENT INVENTION

The present invention overcomes the problems of the prior art by providing a coined pressure release tab in the base of an externally protruding first cup integrally formed in the container bottom, and by forcibly inserting a separate element into the first cup in order to radially prestress the base of the first cup in tension. By radially prestressing the base of the first cup, the depth of the coined indentation can be significantly lessened for any selected release pressure, thus diminishing the extent to which materials are work hardened while at the same time increasing the thickness of the web at the base of the coined indentation. The coining and prestressing thus coact to provide a pressure release tab which is less likely to develop leaks.

Preferably, the separate element consists of a second cup with a metering orifice in its base. The metering orifice controls the rate at which the overpressurized contents of the container are exhausted once the release tab has opened.

These and other objects and advantages will be described in greater detail with the aid of the accompanying drawings, wherein:

BRIEF DESCRIPTION OF THE DRAWINGS

FIG. 1 is a bottom perspective view of a container with a pressure relief device in accordance with the present invention;

FIG. 2 is a bottom plan view on an enlarged scale of the container shown in FIG. 1;

FIG. 3 is a sectional view on a greatly enlarged scale taken along line 3—3 of FIG. 2;

FIG. 4 is a view similar to FIG. 3 showing the pressure relief device after the tab has opened to exhaust overpressurized fluid in the container;

FIG. 5 is an enlarged somewhat schematic cross section taken through a conventional coined line; and FIG. 5A is a view similar to FIG. 5 showing the coined line of the present invention.

BRIEF DESCRIPTION OF THE INVENTION

Referring to the drawings, a container of the type employed to package and dispense pressurized fluids is shown at 10. The container has a tubular metal side wall 12 which is stepped at the upper end as at 14 to accommodate a conventional cap or the like (not shown). Typically, the container will be drawn and ironed from T1 tempered steel sheet stock, the side wall 12 having an I.D. of 2.572" and a thickness on the order of about 0.012". A dome-shaped inwardly concave bottom wall 16 is applied to the lower end of the side wall 12 by any conventional means such as for example a double seam connection. The bottom wall typically can be drawn from T1 tempered steel sheet stock.

An externally protruding first cup 18 is formed as an impression in the bottom wall. The first cup has a first circular wall 18a having an I.D. on the order of 0.562" which is joined at one end to the bottom wall 16 and which is closed at its opposite end by a first base portion 18b. Preferably, the bottom wall 16 is provided with an inwardly protruding shoulder 16a at its juncture with the first cup side wall 18a. Shoulder 16a serves as a reinforcement which resists outward inversion of the bottom wall as the fluid contents of the container become overpressurized. The first side wall 18a meets the first base portion 18b at a first curved shoulder 18c having an inner radius on the order of 0.020".

A somewhat circular tab member 18d is formed in the first cup base portion 18b. The tab member has a diameter of approximately 0.427" and is partially circumscribed by a scored or "coined" line 18e. The depth of the coined line is approximately 0.009", leaving an intact underlying web 18f about 0.003" in thickness.

A second cup 20 is forcibly received in the first cup 18. The second cup has a circular second wall 20a which is open at one end and closed at the opposite end by a second base portion 20b having a metering orifice 20c therein. The second cup typically can be formed from steel sheet stock 0.015" thick, the O.D. of the second side wall 20a being approximately 0.568", and the diameter of the metering orifice being on the order of 0.093". The second side wall 20a joins the second base portion 20b at a curved second shoulder 20d having an outer radius of about 0.035". When the second cup 20 is seated in its operative position as shown in FIG. 3, the cup base portions 18b, 20b are spaced one from the other by a distance "d". The cup base portion 18b and its integral tab member 18d cooperate with the cup base portion 20b in defining a chamber 22. Chamber 22 communicates with the container interior via the metering orifice 20c. Thus, while the pressure release tab 18c remains intact, the fluid pressure on opposite sides of the second base portion 20b in chamber 22 and the interior of the container will be equalized. The outer diameter of wall 20a is sized with respect to the inner diameter of wall 18a so as to radially prestress the first base portion 18b in tension. The line 18e is coined to a depth which weakens the material of the base portion 18b sufficiently, given the tensile prestressing achieved by the coaction of walls 18a and 20a, so that upon overpressurization of the fluid contents of the container, say for example to 280 psi, the base portion 18b separates along line 18e and thereby allows the tab 18d to deflect outwardly as shown in FIG. 4. The outward tab deflection produces an opening 24 through which the overpressurized fluid contents of the container may escape after having first passed through the metering orifice 20c. The metering orifice reduces the rate at which the fluid contents escape, and thereby prevents the escaping contents from generating a force sufficient to propel the container. When the tab 18d opens, a momentary pressure imbalance is created between chamber 22 and the interior of the container. As shown in FIG. 4, this pressure imbalance forces the second cup 20 outwardly against the first base portion 18b.

A comparison of FIGS. 5 and 5A serves to illustrate some of the advantages made possible by prestressing the coined base portion 18b of the outer cup 18. In FIG. 5, a conventional arrangement is shown without prestressing. With a material thickness on the order of 0.010" to 0.012", coining must be carried out to a depth of around 0.009" in order to achieve release of the pressure tab when the fluid contents of the container attain pressures "P" on the order of about 280 p.s.i. The connecting web underlying the coined line thus has a thickness "t" of only about 0.001".

Experience has indicated that these relatively thin webs are succeptible to being fractured during normal handling of the containers, thus resulting in the pressure tabs opening prematurely. Also, these thin webs also often have microscopic cracks which allow the container contents to seep out.

In contrast to the foregoing, as shown in FIG. 5A, the pressure release tab 18d of the present invention is defined by a much shallower coined line 18e, leaving an underlying web 18f of substantially increased thickness t' on the order of 0.003". Nevertheless, the tensile stresses T in the base portion 18b which are induced by forcibly inserting the second cup 20 cooperate with the same internal container pressure P to separate the first base portion at approximately the same selected pressures. The thicker web 18f is much less susceptible to the development of microscopic cracks, and it is much more capable of withstanding damage occasioned by normal handling. The net result is a significantly lower scrap rate during container production, and a significant improvement in container reliability in the field.

I claim:

1. A pressure relief device for a container having a cylindrical side wall which is closed at one end by an internally concave bottom wall, said device comprising:
    an externally protruding first cup formed as an impression in said bottom wall, said first cup having a first circular wall joined at one end to said bottom wall and closed at the opposite end by a first base portion;
    a tab member in said first base portion, said tab member being partially circumscribed by a line of reduced material thickness, said first base portion being adapted to separate along said line in response to an overpressurization of the contents of said container, thus freeing said tab member for outward deflection to provide an outlet through which said contents may escape; and
    a second element having a second circular wall forcibly received within the first circular wall of said first cup, said second circular wall being dimensioned to coact with said first circular wall to radially stress said first base portion in tension.

2. The pressure relief device of claim 1 wherein said second circular wall is open at one end and closed at the opposite end by a second base portion having a metering orifice therein which is smaller than the opening created by the outward deflection of said tab member.

3. The pressure relief device of claim 1 wherein said line of reduced material thickness lies on a circle having its ends separated by a connecting area of said first base portion of substantially undisturbed material thickness and strength.

4. The pressure relief device of either claims 1, 2 or 3 wherein said tab member is outwardly convex.

5. The pressure relief device of claim 2 wherein when said second element is forcibly received in said first cup, said first and second base portions are mutually spaced one from the other to define a chamber therebetween, said chamber being in communication with the interior of said container via said metering orifice.

6. The pressure relief device of claim 5 wherein said first circular wall is joined to said first base portion by an interiorly curved intermediate first shoulder portion.

7. The pressure relief device of claim 6 wherein upon initial separation of said first base portion along siad line in response to over-pressurization of the container contents, said second cup is forced outwardly against said first base portion.

8. For use with a container having an internally concave closure wall, a pressure relief device comprising:
    an externally protruding impression in said closure wall, said impression having a single weakened line of reduced material thickness partially circumscribing a tab member, said line being adapted to rupture in response to overpressurization of the contents of said container, thus permitting said tab member to deflect outwardly and to create an opening through which said overpressurized contents may be vented to the atmosphere, and
    metering means forcibly seated in said impression for radially outwardly stressing said impression and for reducing the rate at which said contents are vented through said opening.

9. The pressure relief device of claim 8 wherein said impression provides a first cup having said tab member located in the base portion thereof.

10. The pressure relief device of claim 9 wherein said metering means comprises a second cup nested within said first cup, said second cup having an orifice in the base portion thereof.

11. A pressure release device for a container which is closed at one end by an internally concave bottom wall, said device comprising:

an externally protruding first cup formed as an impression in said bottom wall, said first cup having a circular first side wall joined at one end to said bottom wall and closed at its outer end by a circular first base portion;

a tab member formed in said first base portion, said tab member being partially circumscribed by a line of reduced material thickness;

and a second cup having a circular second wall open at one end and closed at its opposite end by a second base portion, said second base portion having a metering orifice therein which is smaller in area than the area of the first base portion circumscribed by said line of reduced material thickness, said second cup being forcibly received in said first cup, with said circular second wall coacting with said circular first wall to radially prestress said first base portion.

* * * * *